US006421088B1

(12) United States Patent
Lee

(10) Patent No.: US 6,421,088 B1
(45) Date of Patent: Jul. 16, 2002

(54) DIGITAL CAMERA WITH AN ADJUSTING DEVICE FOR ADJUSTING ITS LENS AND IRISES

(75) Inventor: John Lee, Pu-Ji (TW)

(73) Assignee: Mustek Systems Inc., Hsin-Chu (TW)

( * ) Notice: Subject to any disclaimer, the term of this patent is extended or adjusted under 35 U.S.C. 154(b) by 0 days.

(21) Appl. No.: 09/100,643

(22) Filed: Jun. 19, 1998

(51) Int. Cl.⁷ .......................... G03B 13/00; H04N 5/225
(52) U.S. Cl. ..................... 348/347; 348/351; 348/357; 348/368; 348/374; 396/132; 396/463
(58) Field of Search ................. 348/207, 222, 348/223, 224, 345, 347, 348, 351–357, 362–368, 373, 374, 376; 396/89, 132, 257, 259, 260, 452, 463; H04N 5/238; G03B 13/00

(56) References Cited

U.S. PATENT DOCUMENTS

| | | | | |
|---|---|---|---|---|
| 4,346,972 A | * | 8/1982 | Takahashi | 396/132 |
| 4,506,966 A | * | 3/1985 | Kuge | 396/132 |
| 4,695,144 A | * | 9/1987 | Yoshino | 396/132 |
| 4,918,480 A | * | 4/1990 | Hori | 396/463 |
| 4,924,317 A | * | 5/1990 | Hirao | 348/351 |
| 5,138,355 A | * | 8/1992 | Morisawa | 396/132 |
| 5,258,797 A | * | 11/1993 | Oyoshi | 396/463 |
| 5,313,244 A | * | 5/1994 | Arai | 396/132 |
| 5,978,602 A | * | 11/1999 | Toyofuku | 396/62 |

* cited by examiner

Primary Examiner—Ngoc-Yen Vu
(74) Attorney, Agent, or Firm—Winston Hsu

(57) ABSTRACT

The present invention relates to a digital camera with an adjusting device coupled with the lens and holes of the digital camera. The digital camera comprises a housing with a front opening installed at its front end for receiving incident light, a sensor installed at a rear end of the housing for recording the incident light, an iris strip moveably installed in the housing having a plurality of irises of different sizes for adjusting the amount of the incident light emitted to the sensor, a lens moveably installed in the housing for concentrating the incident light onto the sensor, and an adjusting device rotatably installed in the housing for adjusting positions of the lens and the iris strip. The adjusting device is rotated to move the lens to a plurality of lens positions to change the distance between the lens and the sensor. At each lens position, the adjusting device can also be rotated to move each of the irises on the iris strip to a position between the front opening of the housing and the sensor so as to adjust the amount of the incident light emitted to the sensor.

8 Claims, 5 Drawing Sheets

DIGITAL CAMERA WITH AN ADJUSTING DEVICE FOR ADJUSTING ITS LENS AND IRISES

BACKGROUND OF THE INVENTION

1. Field of the Invention

The invention relates to a digital camera, and more particularly, to a digital camera with an adjusting device coupled with the lens and irises of a digital camera.

2. Description of the Prior Art

Please refer to FIG. 1. FIG. 1 is a component diagram of a prior art digital camera 10. The digital camera 10 comprises a housing 12 with a lens holder 14 and a protruding axle 16 installed on it for mounting components for focusing the digital camera 10.

The digital camera 10 further comprises a lens 22 movably mounted on the lens holder 14 along a front-and-rear direction, a spring 28 installed between the lens 22 and the lens holder 14 for fixing the lens 22 so as to allow movement of the lens 22, a gear wheel 18 rotatably installed on the lens holder 14 and connected with the lens 22 for driving the lens 22, a driving wheel 30 installed on the protruding axle 16 for driving the lens 22 with the gear wheel 18 and adjusting the focus, and a screw 32 for rotatably fixing the driving wheel 30 to the protruding axle 16. The focusing of the digital camera 10 is accomplished by using an actuating device (not shown) to activate the driving wheel 30 and gear wheel 18 and to move the lens 22 along the front-and-rear direction, or by manually adjusting the driving wheel 30 for driving the gear wheel 18 and the lens 22.

The digital camera 10 further comprises a magnetic switch (not shown) and a driving device (not shown) for switching holes of the digital camera 10. Because the lens 22 and the holes are separately controlled, the digital camera 10 is costly to produce, oversized and has many components and electronic parts with complex installation procedures.

SUMMARY OF THE INVENTION

It is therefore a primary objective of the present invention to provide a digital camera to solve the above mentioned problems.

In a preferred embodiment, the present invention provides a digital camera comprising:

a housing with a front opening installed at its front end for receiving incident light;

a sensor installed at a rear end of the housing for recording the incident light;

an iris strip moveably installed in the housing having a plurality of irises of different sizes for adjusting the amount of the incident light emitted to the sensor;

a lens moveably installed in the housing for concentrating the incident light onto the sensor;

an adjusting device rotatably installed in the housing for adjusting the positions of the lens and the iris strip;

wherein the adjusting device can be rotated to move the lens to a plurality of lens positions to change the distance between the lens and the sensor, and at each lens position, the adjusting device can also be rotated to move each of the irises on the iris strip to a position on the front opening of the housing and the sensor so as to adjust the amount of the incident light emitted to the sensor.

It is an advantage of the present invention that the digital camera only requires an actuating device for rotating the adjusting device, changing the lens and iris strip position, focusing the image, and adjusting the light emitted to the sensor. Thus, the digital camera has a simpler structure, more compact size, and lower production cost.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
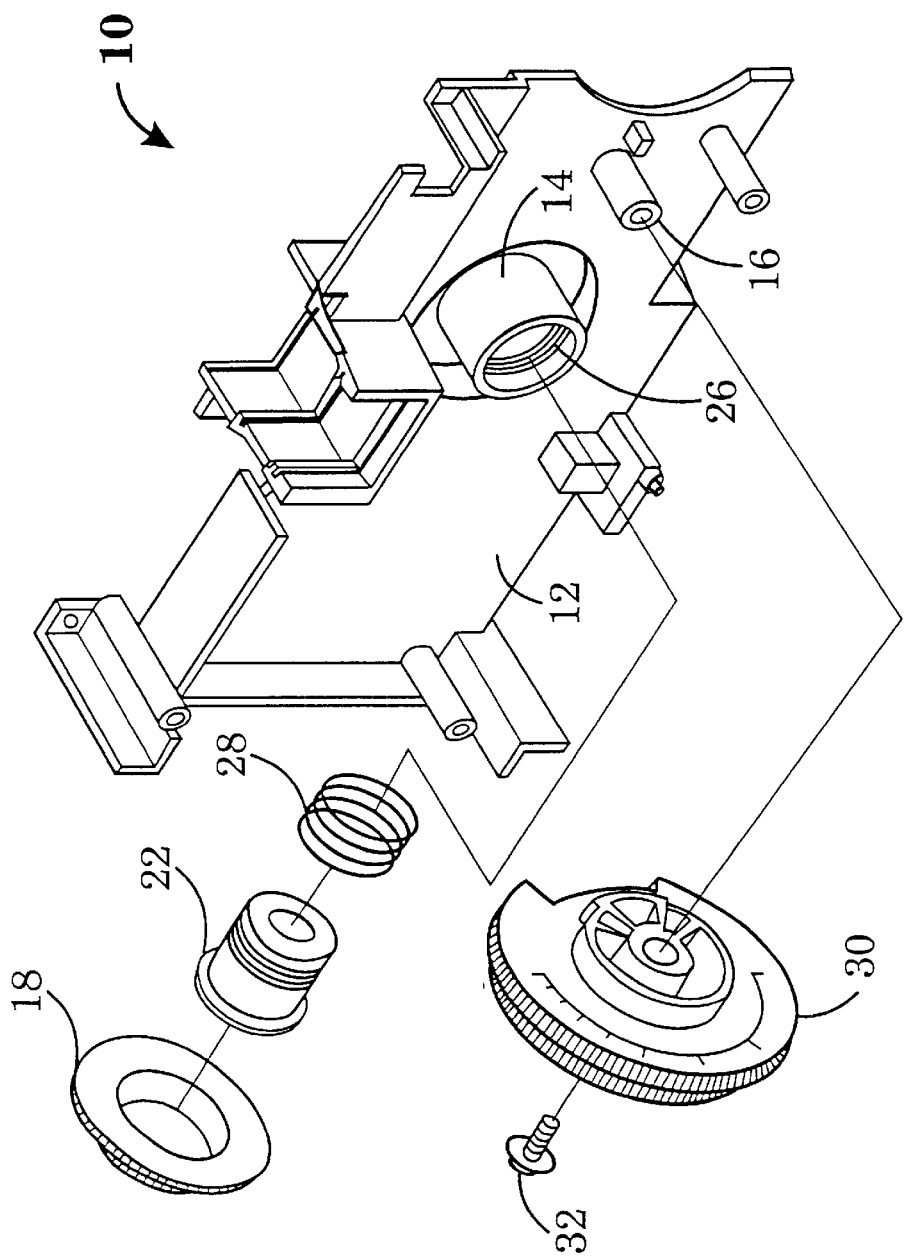
FIG. 1 is a component diagram of a prior art digital camera.
Figure 2:
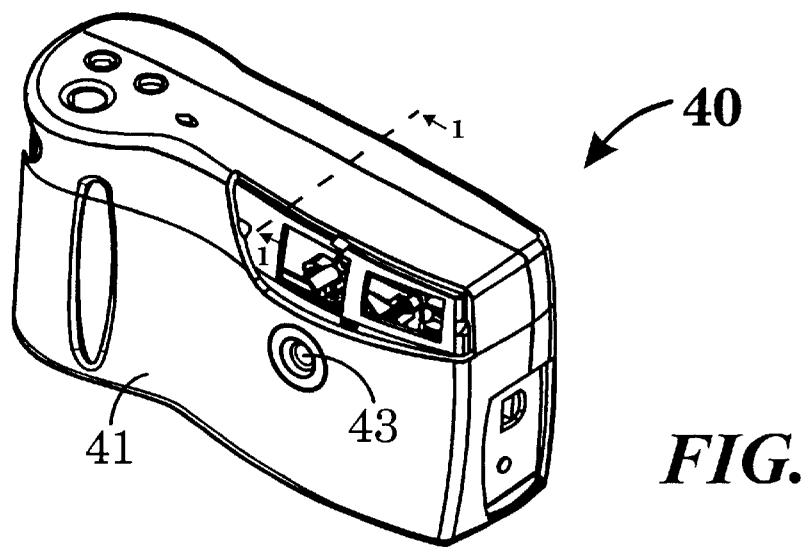
FIG. 2 is a perspective view of a digital camera according to the present invention.
Figure 3:
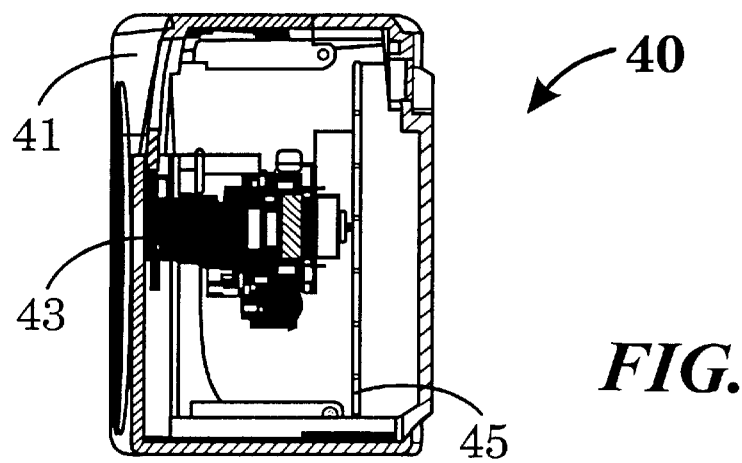
FIG. 3 is a sectional view along line 1—1 of the digital camera shown in FIG. 2.
Figure 4:
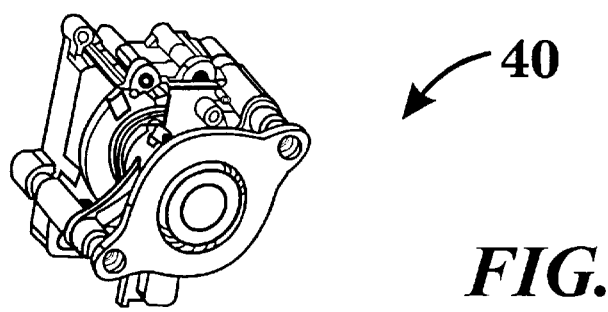
FIG. 4 is a detailed view of the inside structure of the digital camera shown in FIG. 2.
Figure 5:
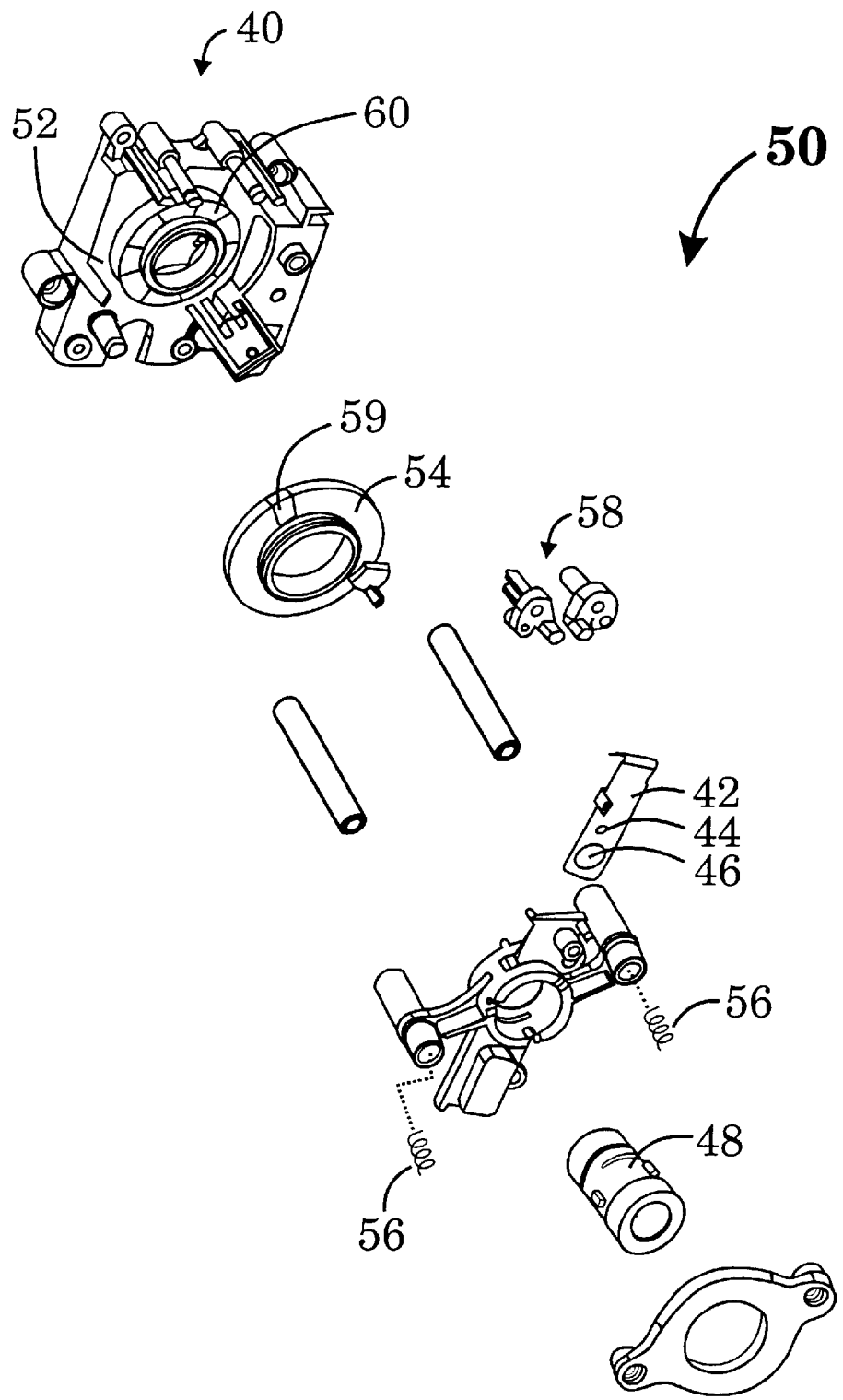
FIG. 5 is a component diagram of the inside structure of the digital camera shown in FIG. 2.

Please refer to FIGS. 2 to 5. FIG. 2 is a perspective view of a digital camera 40 according to the present invention. FIG. 3 is a sectional view along line 1—1 of the digital camera 40. FIG. 4 is a detailed view of the inside structure of the digital camera 40. FIG. 5 is a component diagram of the inside structure of the digital camera 40.

The digital camera 40 comprises a housing 41 with a front opening 43 installed at its front end for receiving incident light, a sensor 45, which is a charge coupled device, installed at a rear end of the housing 41 for recording the incident light, an iris strip 42, with two unequal sized irises 44, 46, movably installed in the housing 41 for concentrating the incident light onto the sensor 45, a lens 48 movably installed in the housing 41 along a front-and-rear direction for concentrating the incident light onto the sensor 45, an adjusting device 50 rotatably installed in the housing 41 for adjusting positions of the lens 48 and iris strip 42, and an actuating device (not shown) for rotating the adjusting device 50 so as to change the positions of the lens 48 and iris strip 42.

The adjusting device 50 comprises a lens pedestal 52 fixed in the housing 41 having a hole in it for the incident light to pass through, a main gear 54 rotatably mounted on a control surface 60 of the lens pedestal 52 between the lens pedestal 52 and the lens 48, and an elastic device 56 for elastically pushing the lens 48 toward the main gear 54 and the lens pedestal 52. When the main gear 54 is rotated, the distance between the main gear 54 and the lens pedestal 52 is changed correspondingly so as to move the lens 48 to various lens positions.

Figure 6:
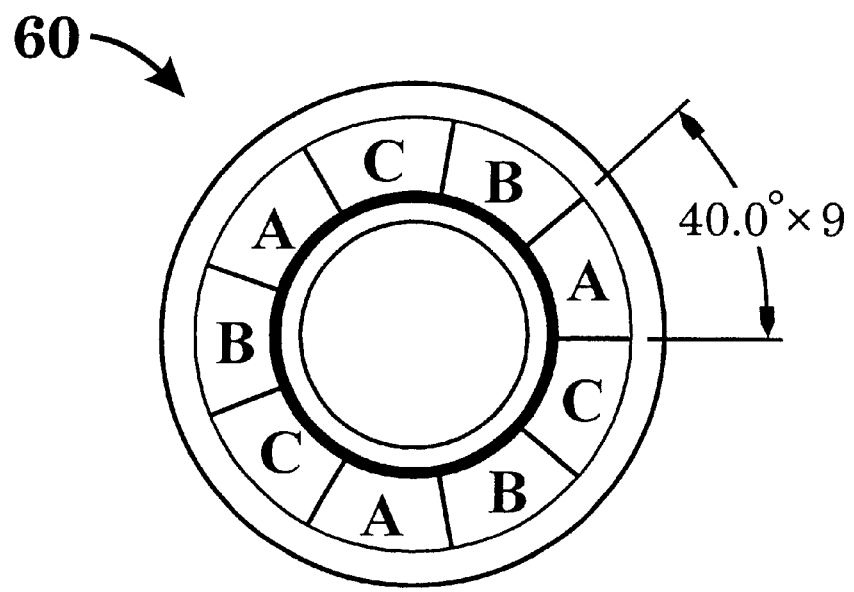
FIG. 6 is a perspective view of the control surface on the lens pedestal shown in FIG. 5.
Figure 7:
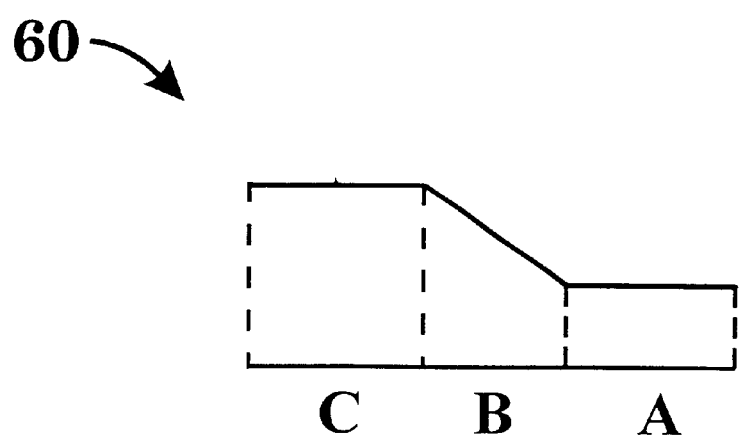
FIG. 7 is. a relative height diagram illustrating relative heights over the control surface shown in FIG. 6.

Please refer to FIGS. 6 and 7. FIG. 6 is a perspective view of the control surface 60 on the lens pedestal 52. FIG. 7 is a relative height diagram illustrating relative heights over the control surface 60. The control surface 60 comprises nine areas of various heights, including three low planes A, three swirling slopes B, and three high planes C. Three feet (not shown) are installed on the rear side of the main gear 54 simultaneously in contact with the three low planes A, three swirling slopes B, or three high planes C of the control surface 60. When the main gear 54 is rotated from the low planes A to high planes C through swirling slopes B, or from the high planes C to low planes A, the contacting feet of the main gear 54 will be moved from the contacting surfaces of one height to the contacting surfaces of another height over the lens pedestal 52 so as to move the lens from one lens position to another lens position.

Figure 8:
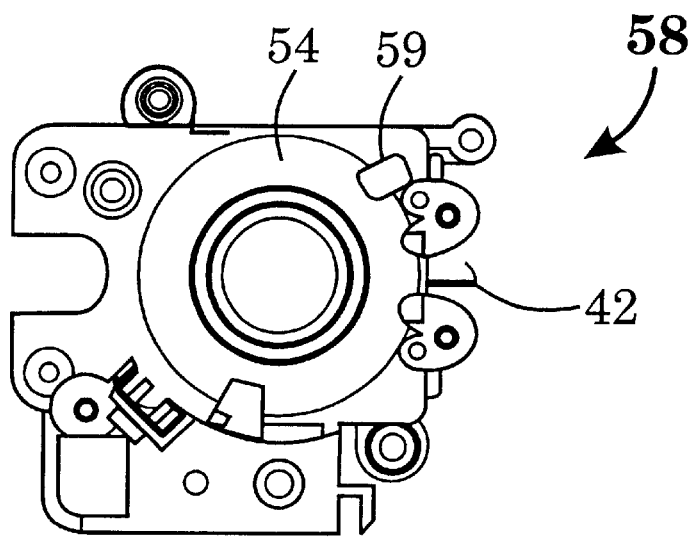
FIG. 8 is a perspective view of the engaging unit shown in FIG. 5 before moving the iris strip.
Figure 9:
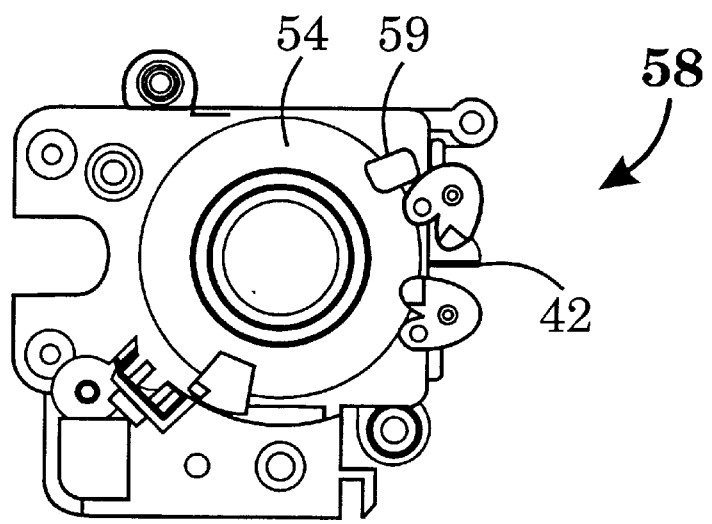
FIG. 9 is a perspective view of the engaging unit shown in FIG. 5 after moving the iris strip.

Please refer to FIGS. 8 and 9. FIGS. 8 and 9 are perspective views of an engaging unit 58 shown in FIG. 5 before and after moving the iris strip 42. The adjusting device 50 further comprises an engaging unit 58 for moving the iris strip 42 and hence alternating the holes 44, 46 on the iris strip 42 at the position between the opening 43 on the front side of the housing 41 and the sensor 45. A handle 59 is installed on the main gear 54 for functioning with the engaging unit 58 to move the iris strip 42. When the main gear 54 is rotated to the low planes A or high planes C for adjusting the focus, the handle 59 on the main gear 54 will interact with the engaging unit 58 for moving the iris strip 42, alternating the holes 44 and 46 and thus adjusting the incident light emitted to the sensor 45.

The digital camera 40 of the present invention requires only an actuating device for rotating the adjusting device 50, changing the lens 48 and iris strip 42 positions, focusing, and adjusting the light emitted to the sensor 45. Thus, the digital camera 40 has a greatly simplified structure, smaller size, and lower production cost.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. An image detecting device comprising:
   a housing with a front opening installed at its front end for receiving incident light;
   a sensor installed at a rear end of the housing for recording the incident light;
   an iris strip moveably installed in the housing having a plurality of irises of different sizes for adjusting the amount of the incident light emitted to the sensor;
   a lens moveably installed in the housing for concentrating the incident light onto the sensor; and
   an adjusting device rotatably installed in the housing for adjusting the positions of the lens and the iris strip, the adjusting device comprising:
      a circular lens pedestal fixed in the housing having a hole in it for the incident light to pass through, the lens pedestal comprising a plurality of contacting surfaces of various heights around its periphery;
      a main gear rotatably mounted on the lens pedestal, the main gear comprising a plurality of contacting feet for contacting the contacting surfaces of the lens pedestal of the same height; and
      an elastic device for elastically pushing the lens toward the main gear and the lens pedestal;
   wherein the adjusting device can be rotated to move the lens to a plurality of lens positions to change the distance between the lens and the sensor, and at each lens position, the adjusting device can also be rotated to move each of the irises on the iris strip to a position between the front opening of the housing and the sensor so as to adjust the amount of the incident light emitted to the sensor, and wherein when the main gear is rotated, the contacting feet of the main gear will be moved from the contacting surfaces of one height to the contacting surfaces of another height over the lens pedestal so as to move the lens from one lens position to another lens position.

2. The image detecting device of claim 1 further comprising an actuating device for rotating the adjusting device so as to change the positions of the lens and the iris strip.

3. The image detecting device of claim 1 being a digital camera wherein the sensor is a charge coupled device for converting the incident light into digital image signals.

4. The image detecting device of claim 1 wherein the adjusting device comprises an engaging unit for moving the iris strip, and the main gear comprises a handle on its periphery for interacting with the engaging unit so as to move the iris strip to various positions.

5. An image detecting device comprising:
   a housing with a front opening installed at a front end for receiving incident light:
   a sensor installed at a rear end of the housing for recording the incident light;
   an iris strip moveably installed in the housing having a plurality of irises of different sizes for adjusting the amount of the incident light emitted to the sensor;
   a lens moveably installed in the housing for concentrating the incident light onto the sensor; and
   an adjusting device rotatably installed in the housing for adjusting the positions of the lens and the iris strip;
   wherein the adjusting device is capable of being rotated to move the lens to a plurality of lens positions to change a distance between the lens and the sensor; when the lens is moved to one of the lens positions, the irises on the iris strip are moved by the adjusting device to a position between the front opening of the housing and the sensor according to the lens position so as to adjust the amount of the incident light emitted to the sensor; and
   wherein the adjusting device comprises a circular lens pedestal fixed in the housing, the circular lens pedestal having a hole for the incident light to pass through, a main gear rotatably mounted on the lens pedestal, and an elastic device for elastically pushing the lens toward the main gear and the lens pedestal; wherein when the main gear is rotated, the distance between the main gear and the lens pedestal is changed correspondingly so as to move the lens to various lens positions; and
   wherein the lens pedestal comprises a plurality of contacting surfaces of various heights around a periphery of the lens pedestal, and the main gear comprises a plurality of contacting feet for contacting the contacting surfaces of the lens pedestal of the same height; wherein when the main gear is rotated, the contacting feet of the main gear are moved from the contacting surfaces of one height to the contacting surfaces of another height over the lens pedestal so as to move the lens from one lens position to another lens position.

6. The image detecting device of claim 5 further comprising an actuating device for rotating the adjusting device so as to change the positions of the lens and the iris strip.

7. The image detecting device of claim 5 being a digital camera wherein the sensor is charge coupled device for converting the incident light into digital image signals.

8. The image detecting device of claim 5 wherein the adjusting device comprises an engaging unit for moving the iris strip, and the main gear comprises a handle on a periphery of the main gear for interacting with the engaging unit so as to move the iris strip to various positions.

* * * * *